Aug. 8, 1961     W. F. COTHERN     2,995,137
VEHICLE RAIN SHELTER
Filed Nov. 13, 1957     2 Sheets-Sheet 1
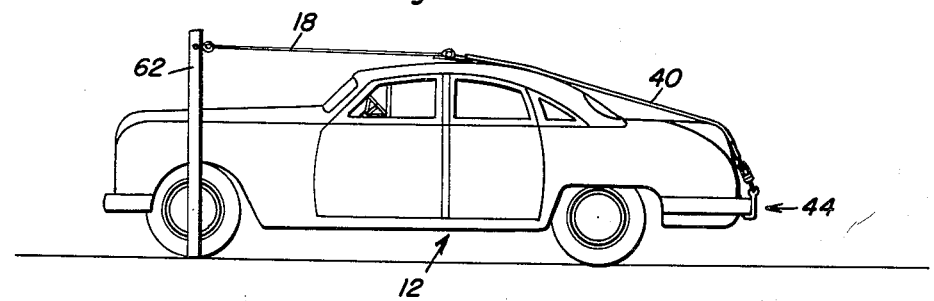
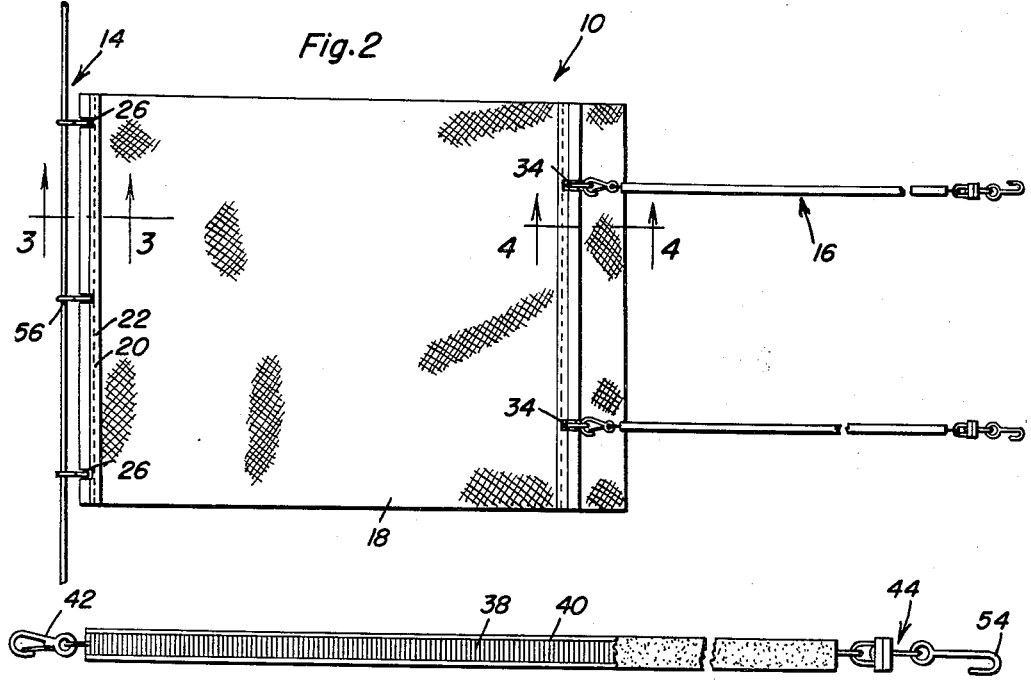
William F. Cothern
INVENTOR.

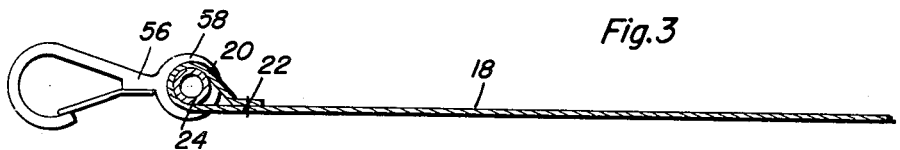
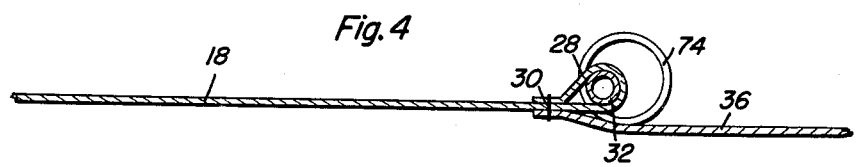
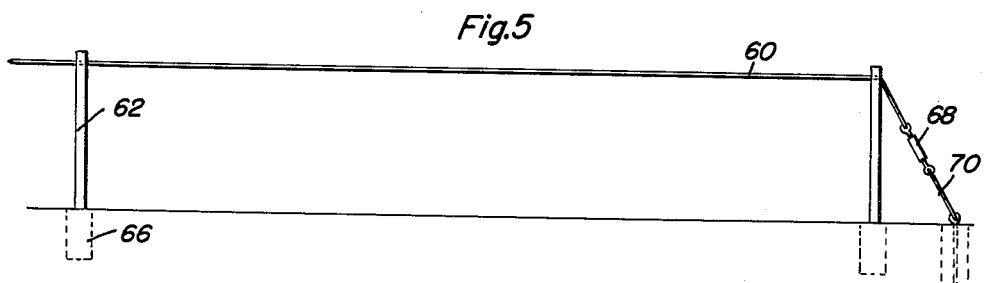
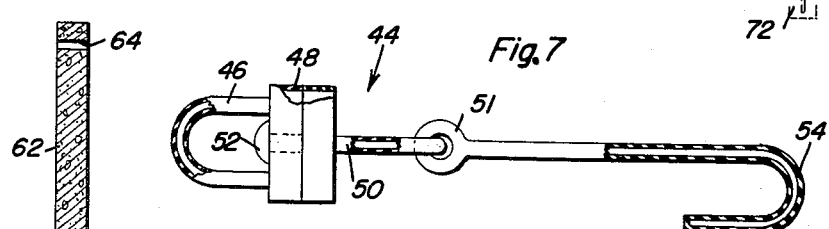
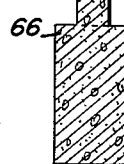

United States Patent Office 2,995,137
Patented Aug. 8, 1961

2,995,137
VEHICLE RAIN SHELTER
William F. Cothern, Tampa, Fla.
(I.A.G.S. Apartado 633, Hermosillo, Sonora, Mexico)
Filed Nov. 13, 1957, Ser. No. 696,122
4 Claims. (Cl. 135—5)

This invention relates generally to a rain protecting device, and more particularly to a vehicle rain shelter.

With the recent popularity of drive-in theaters throughout the country, has come the problem of what to do when it rains. Rain on the windshield of a vehicle will distort any picture that might be seen therethrough. If the windshield wipers of a car are to be used, either the ignition must be turned on, or the motor must be running, both of which conditions are undesirable since either the battery is being used, or gasoline being burned. Therefore, the primary object of this invention is to provide a vehicle rain shelter which may be adapted to fit over vehicles in a drive-in theater, so as to protect windshields of same from the rain, whereby the windshields of these vehicles will remain dry when it rains.

Another object of this invention is to provide a vehicle rain shelter which may be quickly and easily adapted to be used on any type of vehicle.

A still further object of this invention is to provide a vehicle rain shelter which is attached at one end to the vehicle, and attached at the other end to permanent supports in front of and above the windshield of an automobile, or any other type of vehicle, so that the windshield of same will remain dry.

An even further object of this invention is to produce a simple and inexpensive device and yet one which will be exceedingly effective for the purpose for which it is designed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the device comprising the present invention, illustrating the use of same in conjunction with a vehicle;

FIGURE 2 is an elevational plan view of the device comprising the present invention;

FIGURE 3 is an enlarged vertical sectional view taken substantially along the plane defined by reference line 3—3 of FIGURE 2;

FIGURE 4 is an enlarged vertical sectional view taken substantially along the plane defined by reference line 4—4 of FIGURE 2, illustrating details of construction thereof;

FIGURE 5 is a front elevational view of the forward supports for the shelter;

FIGURE 6 is a vertical sectional view taken through one of the permanent supports for the forward supporting section of the shelter;

FIGURE 7 is an elevational view of the rear clamp of the device which is used to connect the shelter to the rear of an automobile, illustrating same with parts being broken away for illustrating details of construction of same; and FIGURE 8 is a partial horizontal sectional view of the rear supporting straps for the shelter.

Referring now more specifically to the drawings, the numeral 10 generally designates the body of the shelter comprising the present invention illustrating it as attached to a vehicle 12, by means of a forward supporting unit 14, and rear supporting straps 16.

The body of the shelter 10, is constructed of a flat, generally rectangular resilient sheet of water repellent material 18. The forward edge of sheet 18 is folded back so as to form a loop 20, which is fixed in such position by means of stitching 22, which forms thereby the transverse loop 20 having a hollow rod 24 inserted therein. Periodically along its length, portions of the loop 20 are cut out, such as is designated by numeral 26, so that access may be gained to bar 24. At the other end of sheet 18, a second loop 28 is formed in a similar manner to loop 20. This loop too is held by means of stitches 30. A second bar 32 is inserted into loop 28, and this bar is parallel to bar 24. Openings 34 are formed in loop 28, similarly to openings 26 formed in loop 20, and for the same reason, namely, to expose portions of bar 32. An extension sheet 36 is stitched at 30 to sheet 18, and extends rearwardly of loop 28.

Resilient strap members 16, are constructed of a spring 38 having a rubber coating 40 thereover. At one end of the spring a snap hook 42 is connected. At the other end is connected a fastener 44. Fastener 44 comprises a loop 46 connected to a suitable base 48. A threadless bolt 50, is pivotally connected through base 48, and has its head 52 extending outwardly on the loop portion thereof. The end of bolt 50 is bent, so as to accommodate the eye 51 of hook 54, which is adapted to be connected to a license plate or rear bumper of a car. The snap hook 42 may be connected to bar 32 at the cut out portions 34, and in this manner it may be seen that the rear portion of body 10 may be resiliently mounted to the rear of a car or vehicle.

The front supporting portion or unit 14 snap hooks 56, which are connected by means of eyes 58 about rod 24, at the cut out portions 26. The snap hooks 56 are connected to a taut wire 60 which is strung transversely of the vehicles, and is held in position by means of stanchions 62, which have cable accommodating horizontal bores 64 therethrough. It will be noted that these stanchions 62 have bases 66 which are inserted into the ground, so as to make them sturdier and give better support to the cables 60. As can be seen in FIGURE 5, the ends of cables 60 are connected to turnbuckles 68 which are by means of connector links 70 attached to an anchor 72 in the ground.

It will be realized, that rings 74 may be disposed about rods 32, and the snap hooks 42 connected thereto, instead of directly about rods 32.

The use of the device will be clearly evident after consideration of the foregoing. In the event rain starts to fall on the windshield of an automobile, it is merely necessary to move the vehicle into the relative position to the stanchion 62, as illustrated in FIGURE 1, and then set up the shelter proper 10, in the position illustrated in FIGURE 1, so that the shelter will protect the windshield from contact by the rain, and thus keep the windshield clear, thus giving greater and clearer visibility.

It may now be seen that I have herein shown and described a new and improved type of vehicle rain shelter, which is particularly designed for use in drive-in theaters.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A drive-in vehicle rain shelter under which at least one vehicle may be parked comprising a support unit, said support unit including at least one pair of upright support members each adapted to have their lower ends embedded in the ground, said support members being spaced apart a distance sufficient to receive therebetween at least one vehicle and having a generally horizontally disposed support element secured between the upper ends thereof, said support members being of a height adapted to extend above the top of a motor vehicle while their lower ends are embedded in the ground on which the vehicle is disposed and to support said support element above the forward portion of said vehicle, a water repellent body of a width sufficient to extend substantially the entire width of a vehicle windshield and of sufficient length to reach from a point forward of a vehicle windshield to the downward sloping rear portion of a vehicle, means for removably and slidably fastening the forward edge of said body to said support element for movement longitudinally therealong whereby said body may be moved to a desired point above a vehicle beneath said support unit, means for connecting the rear edge of said body to the rear of a vehicle.

2. The combination of claim 1 wherein said fastening means comprises a plurality of snap hooks secured to the front marginal edge portion of said body at spaced points therealong, said snap hooks each being readily engageable and disengageable with said support element.

3. The combination of claim 1 wherein said connecting means includes resilient strap means comprising at least one rubber covered expansion coil spring, means detachably connecting one end of said coil spring to the rear portion of said body, and securing means on the other end of said spring adapted for removable securement to the rear portion of a vehicle.

4. The combination of claim 3 wherein said securing means comprises a hooked member pivotally secured to said other end of said coil spring for movement about an axis extending longitudinally of said coil spring.

References Cited in the file of this patent

UNITED STATES PATENTS

| | | |
|---|---|---|
| 13,600 | Nelson | Sept. 25, 1855 |
| 1,394,579 | Purcell | Oct. 25, 1921 |
| 2,097,923 | Hutchinson | Nov. 2, 1937 |
| 2,496,085 | Engelheart | Jan. 31, 1950 |
| 2,573,060 | Rauglas | Oct. 30, 1951 |
| 2,598,940 | Robie | June 3, 1952 |
| 2,679,255 | Stafford | May 25, 1954 |

FOREIGN PATENTS

| | | |
|---|---|---|
| 835,702 | France | Oct. 2, 1938 |